United States Patent [19]

Asano

[11] 4,162,835
[45] Jul. 31, 1979

[54] DATA PRINTING DEVICE FOR CAMERA
[75] Inventor: Seiji Asano, Okegawa, Japan
[73] Assignee: Fuji Photo Optical Co., Ltd., Omiya, Japan
[21] Appl. No.: 800,060
[22] Filed: May 24, 1977
[30] Foreign Application Priority Data
 May 26, 1976 [JP] Japan .............................. 51-67194[U]
[51] Int. Cl.² ..................... G03B 17/24; G03B 27/68
[52] U.S. Cl. .................................... 354/106; 355/40; 355/52
[58] Field of Search ..................... 354/105, 106, 109; 355/40, 52; 250/476; 353/70
[56] References Cited
U.S. PATENT DOCUMENTS
2,607,268  8/1952  Bartz ........................... 355/52 X
4,025,931  5/1977  Taguchi et al. ................ 354/105
4,028,713  6/1977  Ohashi et al. .................. 354/106

FOREIGN PATENT DOCUMENTS
549085  7/1956  Belgium .................................... 355/52
2604067  5/1976  Fed. Rep. of Germany ........... 354/106

Primary Examiner—Michael L. Gellner
Attorney, Agent, or Firm—Harold L. Stults; William S. Frommer

[57] ABSTRACT

In a photographic camera having a built in data printing device with an optical axis of a focusing lens of the device inclined at an angle with respect to the optical axis of the taking lens of the camera. A plurality of data carrying plates carrying different indicia are positioned parallel to the surface of the film loaded in the camera and on which the data are to be printed. The sizes of the indicia carried by the different data carrying plates are of different sizes from each other so that the sizes of the images printed on the film are equal to each other.

3 Claims, 4 Drawing Figures

F I G. 1
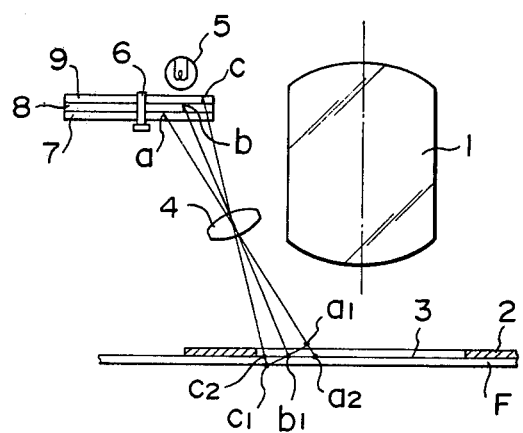
F I G. 2A
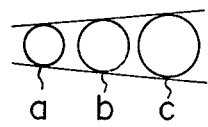
F I G. 2B
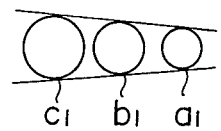
F I G. 2C
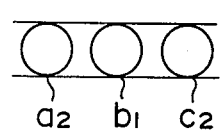

DATA PRINTING DEVICE FOR CAMERA

BACKGROUND OF THE INVENTION

1. Field of the Invention

This invention relates to a data printing device built into a camera, and more particularly to an improvement in data printing device for printing the photographing date or the like on the film when the picture is taken in a camera.

2. Description of the Prior Art

In a data printing device built into a camera, the optical axis of the optical system for printing the data on the film is normally inclined at an angle with respect to the line normal to the film face in order to save the space occupied thereby. Since the optical axis is inclined, it has been known in the art to provide a data carrying plate or the like in the position optically conjugate with the film face in order that the image of the date carried on the data carrying plate is is not of deformed shape on the film.

In the above described conventional data printing device, the magnifications of the image of the different indicia at different positions are different from each other since the distances of the different indicia from the lens in the printing optical system are different from each other.

In order to make the magnifications of the image of the different indicia at different positions all equal to each other, it is considered that one solution is to orient the data carrying plate or the like in parallel to the film face. Since the focal depth of the lens used in the data printing optical system is normally large, it is possible to obtain sharp images of the data on the film, even if the data carrying plate or the like is oriented to be parallel to the film face in the optical axis inclined at an angle with respect to the line normal to the film face.

However, the data printing device usually employs a set of data carrying plates consisting of several rotatable plates or discs which carry, for instance, days, months and years, respectively. The several rotatable plates are superposed and accordingly and positions of the indicia carried along the different plates are not on a plane which is precisely parallel to the film face. Therefore, even if the data carrying plates are oriented in parallel to the film face, the size of the data printed on the film is not uniform.

SUMMARY OF THE INVENTION

The primary object of the present invention is, therefore, to provide a data printing device built into a camera in which all data are printed on the film in the same size.

Another object of the present invention is to provide a data printing device built into a camera in which data are printed on the film sharply and undeformed.

Still another object of the present invention is to provide a data printing device built into a camera which occupies a small space.

A further object of the present invention is to provide a data printing device built into a camera which can be manufactured at a low cost.

The above objects of the invention are accomplished by providing a set of data carrying plates in parallel to the film face and the sizes of the letters carried on different plates being different from each other so that the sizes of the indicia printed on the film are equal to each other. Since the data carrying plates are parallel to the film face, the image of the data is not deformed.

BRIEF DESCRIPTION OF THE DRAWING

FIG. 1 shows an embodiment of the data printing device built into a camera in accordance with the present invention, FIG. 2A shows the sizes of the indicia carried by the data carrying plates, FIG. 2B shows the sizes of the indicia formed on an image plane parallel to the plane on which the indicia carried by the data carrying plates are positioned, and FIG. 2C shows the sizes of the indicia formed and accordingly recorded on the film.

DESCRIPTION OF THE PREFERRED EMBODIMENTS

Now a preferred embodiment of the present invention will be described in detail with reference to the accompanying drawing. Referring to FIG. 1, a taking lens 1 is located in front of an aperture 3 of a mask plate 2 in a camera body. The mask plate 2 is located in front of a film F to define a picture frame by the aperture 3. The optical axis of the taking lens 1 is perpendicular to surface of the film F. A focusing lens 4 of a data printing device is located at the side of the taking lens 1. The optical axis of the focusing lens 4 is inclined at an angle with respect to a line normal to the surface of the film F. In parallel to film F, three rotatable data carrying plates 7, 8 and 9 are provided. The data carrying plates 7, 8 and 9 are rotatably mounted on a shaft 6 extending parallel to the optical axis of the taking lens 1. The first data carrying plate 7 carries indicia indicating years. The second data carrying plate 8 carries indicia indicating months. The third data carrying plate 9 carries indicia indicating days. The indicia of which the image is to be printed are indicated at a, b and c. Behind the indicia a, b and c to be printed there is a lamp 5 located to illuminate the indicia from behind. The indicia are projected onto the film F and the images of the indicia are focused on the surface of the film F as indicated at $a_2$, $b_1$ and $c_2$. Since the data carrying plates 7, 8 and 9 have a thickness, the positions of indicia a, b and c are not in a plane parallel to the surface of the film F but are in a plane inclined at an angle with respect to said plane parallel to said surface. Therefore, the image plane of the images focused by the focusing lens 4 is also inclined at an angle with respect to the film F. The images formed on the image plane are indicated at $a_1$, $b_1$ and $c_1$. The image $b_1$ formed on the image plane is identical with said image $b_1$ formed on the film F. Since, as shown in FIG. 1, the distance of the image $a_1$ from the lens 4 is smaller than that of the image $a_2$ from the lens 4, the size of the image $a_1$ is smaller than that of the image $a_2$ on the film F. On the other hand, since the distance of the image $c_1$ from the lens 4 is larger than that of the image $c_2$ from the lens 4, the size of the image $c_1$ is larger than that of the image $c_2$.

In view of the difference in size of the images formed on the image plane and the film, the sizes of the indicia a, b and c are different from each other as shown in FIG. 2A. As shown in FIG. 2A, the size of the letter a is the smallest and the size of the letter c is the largest. Therefore, as shown in FIG. 2B, the size of the image $a_1$ on the image plane is the smallest and that of the image $c_1$ is the largest. Since the image plane is inclined at an angle with respect to the surface of the film F as mentioned hereinbefore, the sizes of the images $a_2$, $b_1$ and $c_2$ printed on the film F are all equal to each other as shown in FIG. 2C. Since the focusing lens 4 has a focal depth large enough to make the images $a_2$ and $c_2$ sharp, sharp images $a_2$, $b_1$ and $c_2$ are printed on the film F. Thus, sharp images of the data are printed on the film undeformed and in the same size.

I claim:

1. Data printing means built into a camera which includes a taking lens having an optical axis perpendicular to the surface of a film loaded in the camera comprising, a focusing lens in the camera having an optical axis passing through a part of the film loaded in the camera and inclined at an angle with respect to the optical axis of the taking lens, and data carrying means including a plurality of stacked data carrying plates which carry different indicia, one of the indicia on each plate being selectively put into alignment with the optical axis of said focusing lens, each of said plates having a thickness that the indicia on the different plates are at different distances from the surface of said film, characterized in that said plates are parallel to the surface of said film and said different indicia items carried by the different plates are different in size in such a way that the sizes of the images focused on the film by said focusing lens are substantially the same.

2. Data printing means according to claim 1, wherein said different indicia are brought into alignment with the optical axis of said focusing lens in a plane perpendicular to the optical axis of the focusing lens.

3. In a camera having a lens with an optical axis perpendicular to a film frame which is positioned to be exposed, data-printing means positioned in spaced relationship with respect to said optical axis and comprising, a focusing lens with its optical axis at a predetermined angle to the first-named optical axis and extending toward a predetermined area of said film frame with its focal plane at said predetermined angle to the plane of said film frame, indicia-carrying means formed by a plurality of indicia members and means mounting said indicia members to be moved independently, each of said indicia members bearing a plurality of indicia items which are positioned individually parallel to said film frame and being selectively brought to an exposure position, the thickness of said indicia members being such that the indicia items of said plurality of indicia members which are selectively brought to the exposure position are arranged in a plane substantially perpendicular to said optical axis of said focusing lens, and means to project light through said indicia members and said focusing lens onto said film frame, the focal depth of said focusing lens being such that the images of all of said indicia items are in true focus on said film with the indicia items on each of said indicia members being at a distance X from the image thereof focused on said film, said indicia items borne by the different indicia members being of different sizes, the relationship between the size of said indicia items and the distance X for each of said indicia members being such that an indicia item having a lesser distance X than that of another has a greater size with respect to that of said another indicia item, the relative sizes of said indicia items being such with respect to the distances X that the images focused on the film are of the same size.

* * * * *